Oct. 11, 1966 M. F. GIASI 3,277,574
BLOCK CHEESE CUTTER
Filed March 29, 1965 4 Sheets-Sheet 1

INVENTOR.
MICHAEL F. GIASI
BY
ATTORNEY

Oct. 11, 1966  M. F. GIASI  3,277,574
BLOCK CHEESE CUTTER

Filed March 29, 1965  4 Sheets-Sheet 2

INVENTOR.
MICHAEL F. GIASI

BY
ATTORNEY

INVENTOR.
MICHAEL F. GIASI
BY
ATTORNEY

INVENTOR.
MICHAEL F. GIASI

BY

ATTORNEY

United States Patent Office
3,277,574
Patented Oct. 11, 1966

3,277,574
BLOCK CHEESE CUTTER
Michael F. Giasi, 359 Maple St., West Hempstead, Long Island, N.Y.
Filed Mar. 29, 1965, Ser. No. 443,579
4 Claims. (Cl. 31—25)

The present invention relates to a block cheese cutter, and more particularly to a cheese cutter for forming cubes from large blocks of cheese.

In the preparation and making of pizza pies and other foods requiring a cheese coating thereon, in restaurants and the like, it is necessary to place cheese on the entire surface thereof. The problem that arises is due to the fact that during the course of a single day a substantial amount of cheese is required, and at the present time the cheese is either ground or cubed from blocks and stored in a refrigerator. However, if the cheese is ground, refrigeration thereof tends to cause the ground particles to adhere together, thus making it difficult to spread the same upon the surface of a pizza pie or the like. If the cheese is cubed, it is much easier to spread the same upon the surface of a pizza pie. Since the time required for cubing blocks of cheese is very substantial, and requires an individual to spend many hours after the close of business to cut said blocks into small pieces, it becomes an arduous and costly procedure.

It is therefore the primary object of the present invention to provide a cutting device, which will permit an individual to easily and quickly cut blocks of cheese into small cubes.

It is another object of the present invention to provide a block cheese cutter which is portable and may be used to great advantage in restaurants or the like for cutting blocks of cheese into small cubes for use in the making of pizza pies and other foods requiring a cheese coating.

It is yet another object of the present invention to provide a block cheese cutter having a plurality of individually strung cutting wires which may be independently adjusted or independently replaced when broken.

It is a further object of the present invention to provide a block cheese cutter for cutting blocks of cheese into small cubes, which cubes may be stored in a refrigerated enclosure for relatively long periods of time without any significant change in their physical state, whereby said cubes may be removed from said refrigerated enclosure and directly applied to said pizza pie in the making thereof.

It is still a further object of the present invention to provide a block cheese cutter of relatively simple construction which is durable and which can be easily cleaned when the same is necessitated.

These and other objects, features and advantages of the present invention will become more apparent when considered in conjunction with the accompanying drawings wherein.

Figure 1:
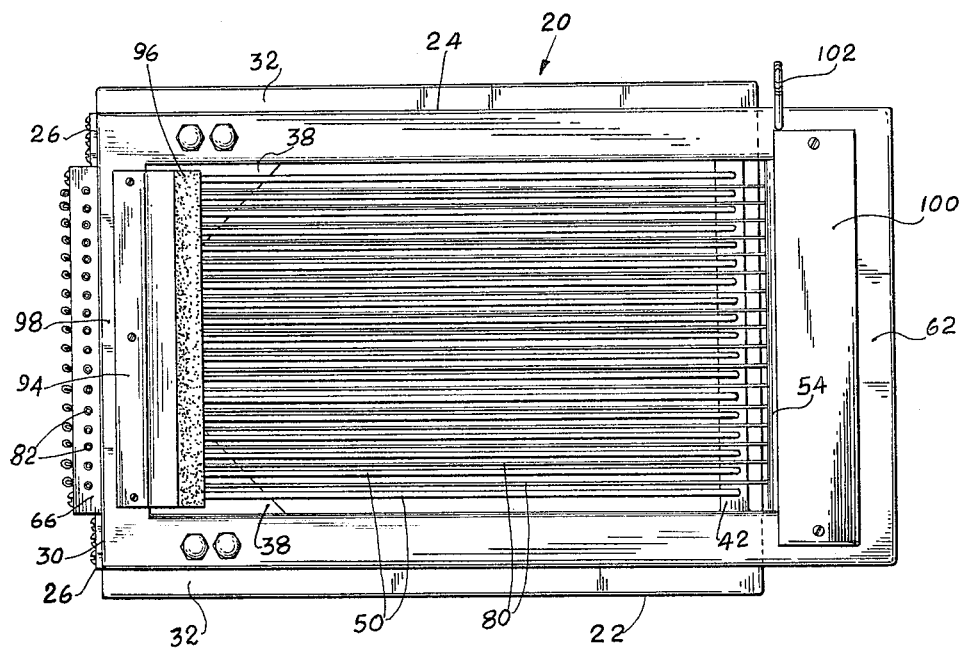
FIGURE 1 is a top view of a first embodiment of a block cheese cutter constructed in accordance with the present invention, wherein the top member thereof is in its closed position.
Figure 2:
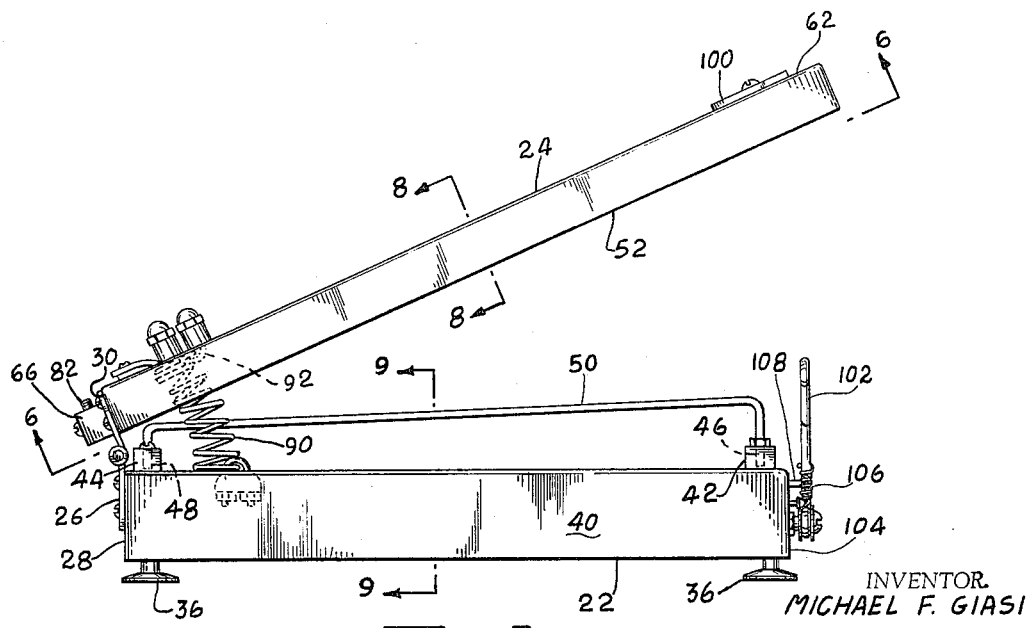
FIGURE 2 is a side view of the block cheese cutter depicted in FIGURE 1, wherein the top member thereof is in its open position.
Figure 3:
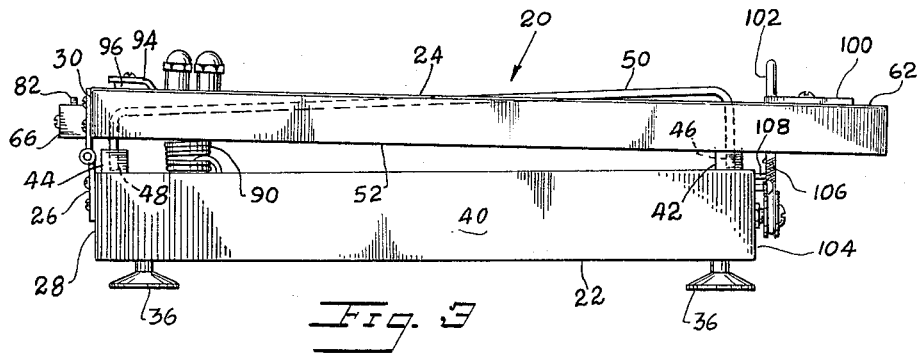
FIGURE 3 is a side view of the block cheese cutter depicted in FIGURE 1, wherein the top member thereof is in its closed position.
Figure 4:
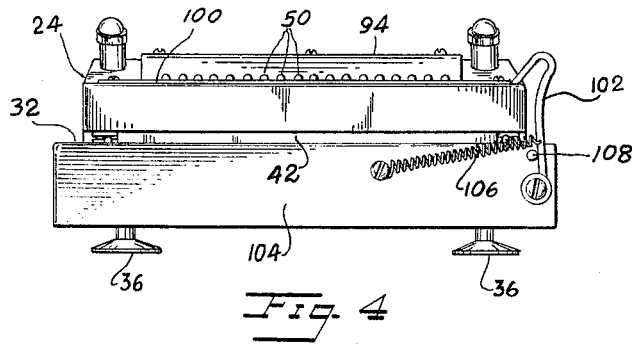
FIGURE 4 is a front view of the block cheese cutter depicted in FIGURE 1.
Figure 5:
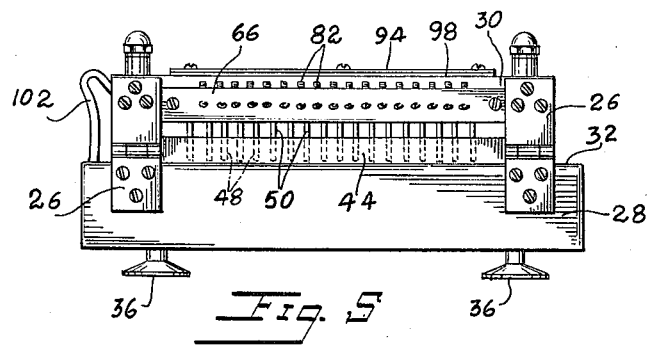
FIGURE 5 is a rear view of the block cheese cutter depicted in FIGURE 1.

Referring now to the drawings, and more particularly to FIGURES 1 through 9 thereof, there is shown a block cheese cutter 20 constructed in accordance with the first embodiment of the present invention. The cutter 20 consists of a rectangular shaped base 22 and a larger rectangular member 24, which serves as the cutting member, and which is pivotally connected to said base by means of hinges 26 which are secured, in a conventional manner, to the rear walls 28 and 30, respectively, of said base and cutting member; said cutting member being pivotal in a vertical plane.

The base 22 includes inwardly directed upper and lower peripheral flanges 32 and 34, respectively, which are formed integrally therewith. The lower flange 34 has rubber suction cups 36 secured to the underside thereof, adjacent the corners of said base, which cups serve to prevent any undesired movement of said cutter during the cutting operation, as will be discussed more fully hereinafter. The upper flange 32 has a pair of triangular shaped plate members 38 secured to the underside thereof, such as by welding, and abut the sides 40 and rear face 28 of said base. It should be noted, however, that the plate members 38 may also be formed integrally with said upper flange 32. Secured to the topside of the flange 32 at the front and rear of said base are transverse rectangular bars 42 and 44, respectively, each having a plurality of holes or bores 46 and 48, respectively. A plurality of cylindrical rods 50, whose end portions have right angle bends, are connected to said rectangular bars, which serve as support members therefor, by having their respective end portions force-fitted into the bores 46 and 48 of said rectangular bars 42 and 44, respectively; said cylindrical rods being disposed longitudinally across said base in spaced parallel relationship and sloping downwardly from the front towards the rear thereof.

The cutting member 24 includes side portions 52 and a transverse, substantially U-shaped member 54, connected to said side portions, such as by welding. The member 54 has arms 56 and 58 and the arm 58 extends both vertically downwardly and horizontally across, further than the arm 56, and has a plurality of spaced horizontal openings 60 therein; said arm 58 being slightly spaced from the top front portion 62 of said cutting frame and forming a recess or slot 64 with respect thereto. Secured to the outer surface of the rear wall 30 of said cutting member is another rectangular bar member 66 having a plurality of spaced horizontal openings 68 and a plurality of spaced vertical threaded bores 70, the axes of said openings 68 and said bores 70 being in transverse intersecting alignment. Secured to the inner surface of the rear wall 30 is a rectangular bar 71.

Figure 6:
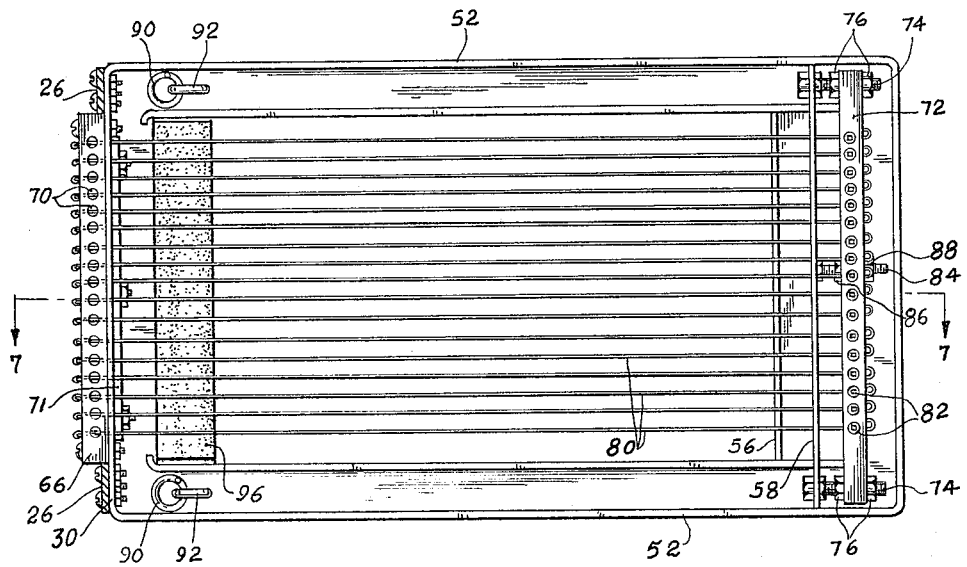
FIGURE 6 is a bottom view of the top member of the block cheese cutter taken on the line 6—6 of FIGURE 2.
Figure 7:
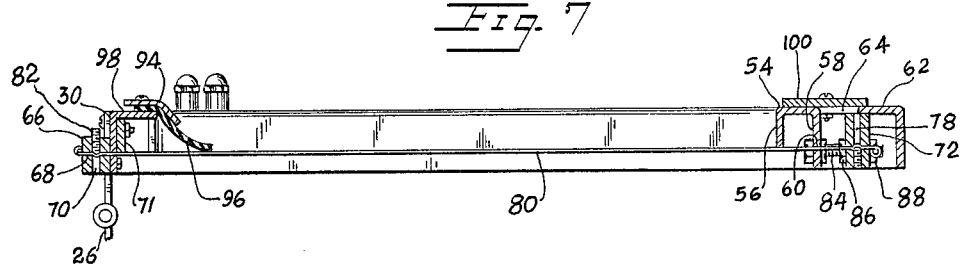
FIGURE 7 is a sectional view taken on the line 7—7 of FIGURE 6.
Figure 8:
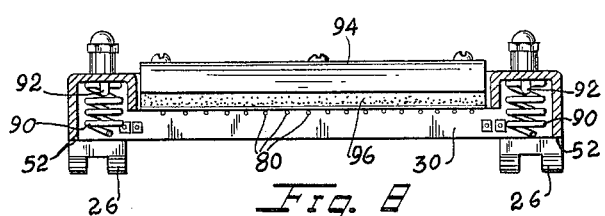
FIGURE 8 is a sectional view of the top member of the block cheese cutter taken on the line 8—8 of FIGURE 2.
Figure 9:
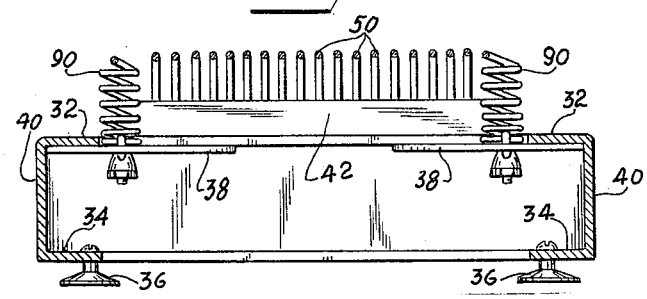
FIGURE 9 is a sectional view of the bottom member of the block cheese cutter taken on the line 9—9 of FIGURE 2.

Another rectangular bar 72 is secured to and spaced from the arm 58 of the transverse member 54 by means of bolts 74 and nuts 76 (as best seen in FIGURES 6 and 7). The bar 72 has a plurality of spaced horizontal openings 77 and a plurality of spaced vertical threaded bores 78; the axes of said openings 77 and said bores 78 being in transverse intersecting alignment. A plurality of individual cutting wires 80 are strung longitudinally across said cutting member in spaced parallel relationship by inserting one of the ends thereof into said openings 68 in the bar 66, and thence through the openings 60 in the arm 58 of the member 54 and the openings 77 in the bar 72; the ends of said cutting wires being bent to form a loop to prevent the same from being pulled through either of the openings 68 or 77. Downwardly disposed within said threaded bores 70 are Allen-type screws 82, while upwardly disposed within said threaded bores 78 are Allen-type screws 84, which screws when tightened cause the ends of the cutting wires disposed within said bore to form a slight detent, thereby tensing said wires. The cutting wires are initially made taut by spacing the bar 72 away from the arm 58 of the member 54, by adjusting the bolts 74 and nuts 76. A center bolt 84 having a nut 86 for threadedly engaging the same are interposed between the center of the member 58 and bar 72 to keep the same properly spaced from one another; another nut 88 is placed upon said bolt 84 and abuts the forward face of the bar 72, thereby preventing an undesired rotation of said bolt. After the bar 72 has been adjusted the individual cutting wires can be adjusted for proper tension by means of said Allen type screws.

It should be noted that when the cutting wires 80 are properly tensed the bar 71 abuts the same at the rear of said cutting member, while the arm 56 abuts said cutting wires at the front thereof. The bar 71 and the arm 56 therefore serve as support members for said wires and serve to limit the amount of tension and strain upon the ends of said wires during the cutting operation, as will be more fully described hereinafter.

The cutting member 24 is biased in an upward or angularly inclined position with respect to said base by means of coiled springs 90, which springs have the bottom portions thereof mounted on said plate members 38, in a conventional manner by means of threaded U-bolts 92, and the top portions thereof are connected to said side portions 52 at the rear of said cutting member by means of said threaded U-bolts.

The cutting member also has an angle member 94 and a rubberized member 96 connected to the top rear portion 98 thereof, said rubberized member being interposed between said angle member and said top rear portion. Secured to the top front portion 62 of the cutting member is a cover plate 100 which is positioned above the slot 64 and serves to cover the same.

A locking member 102 has the bottom portion thereof pivotally connected to the front wall 104 of said base and a helical spring 106 has one end thereof connected to said locking member and the other end thereof connected to said front wall. The spring 106 biases the locking member inwardly and a stop 108, which is connected to said front wall, serves to limit the inward pivotal movement thereof. The cutting member is locked in its downward position by pushing the same downwardly against the upward biasing force of the coiled springs 90, thereby causing the right side portion 52 to contact the top portion of the locking member moving it outwardly away from said base, and further downward movement allows the spring 106 to move the locking member inwardly, whereupon it engages the top surface of said right side portion 62, thereby locking said cutting member in said downward position. When it is desired to raise the cutting member to its upward position, all that need be done is to move the locking member outwardly away from said base by means of one's thumb.

In the operation of the cutter 20 a block of cheese (not shown) is placed upon the rods 50 and the cutting member is moved from its upward to its downward position, causing the cutting wires to slice the cheese into a number of slabs; said cutting wires 80 and said rods 50 being laterally offset with respect to one another whereby the wires move downwardly into the spaces between said rods. After the first slicing operation, the cutting member is locked in its downward position and the slabs of cheese are removed therefrom in block form and the cutting member is then moved to its upward position by disengaging the locking member 106, as described previously. The slabs of cheese in block form are then rotated 90° in a transverse vertical plane with respect to said rods and placed thereupon, and the slicing operation is repeated forming strips of cheese, still in block form. The block is then removed and again the cutting member is moved to its upward position. The strips of cheese in block form are then horizontally rotated 90° and placed upon said rods, and the final slicing operation is then performed, forming cubes of cheese of substantially uniform size. The cutting member is then permitted to return to its upward position while the cubes are still positioned on said rods, thus causing the cutting wires to move the cubes rearwardly, and a receiving receptacle (not shown) placed behind the cutter, receives said cubes. The angle member 94 and the rubberized member 96 serve to permit said cubes of cheese to roll upwardly thereon and thence into said storing receptacle. As stated previously, the bar 71 and the arms 56 of the U-shaped member 54 abut the cutting wires, whereby the force applied to said wires during the slicing operation is absorbed mainly by the center portions thereof and those portions of the wires positioned forwardly of the arm 56 and rearwardly from the bar 71 receive a limited force, thereby transmitting a limited force to the ends of said wire, thus preventing the same from becoming easily broken. It should also be noted that the arm 58 of said member 54, through which said wires pass, acts as a support therefor, further insuring that the force transmitted to the ends of said wire is limited. However, in the event that one of the wires should become broken, the same is easily replaced and the tension thereon is easily adjusted by means of the Allen-type screws 82 and 84. It will be apparent that, should one cutting wire break, the others thereof need not be disturbed during the replacement of said broken wire.

The suction cups 36 secured to the bottom of the base 22 serve to detachably secure the cutter to the table or counter top upon which it is placed for the cutting operation. By securing the cutter in this manner, there is no undesired movement produced when the cutting member is forced downwardly in the cutting operation, thereby permitting the operator to quickly and easily perform the repeated cutting operations required.

The material used in the construction of said cutter is preferably metal, and more particularly steel, thereby forming a heavy duty cutter which is capable of producing cubes of cheese from blocks thereof; said cubes preferably being formed having ½ inch sides.

Figure 10:
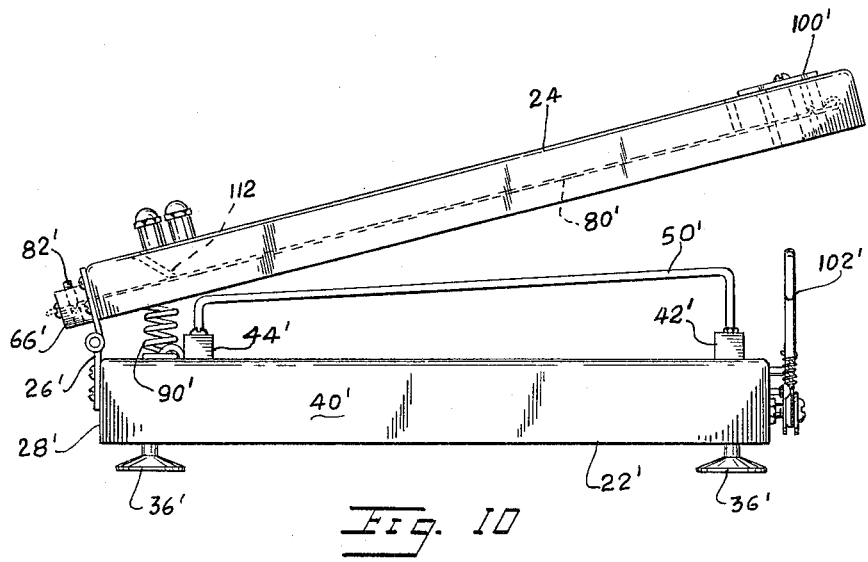
FIGURE 10 is a side view of a second embodiment of a block cheese cutter constructed in accordance with the present invention, wherein the top member thereof is in its open position.
Figure 11:
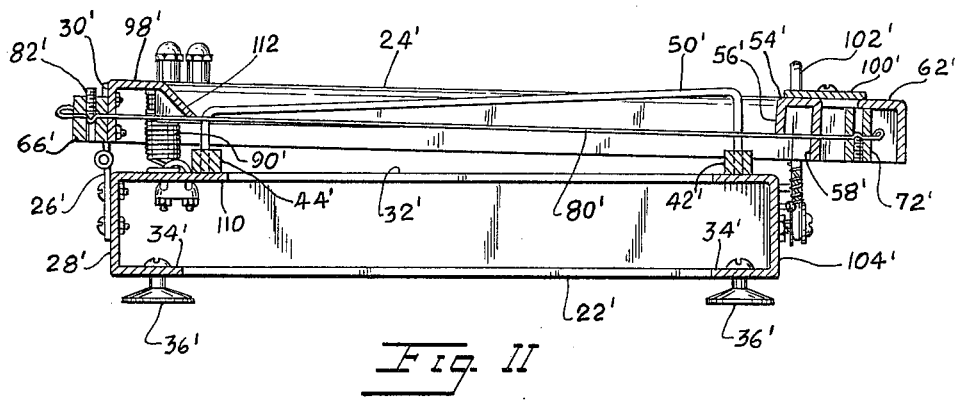
FIGURE 11 is a longitudinal sectional view of the block cheese cutter shown in FIGURE 10, wherein the top member thereof is in its closed position.

A second embodiment of the present invention is depicted by FIGURES 10 and 11, wherein similar parts are denoted by similar reference numerals.

In this embodiment the rear portion 110 of the upper flange 32' is made substantially larger than the other portions thereof; i.e., it projects forwardly from the rear of the base 22' to the front thereof a substantial distance. The bar 44' is mounted on the foremost portion thereof, thus reducing the length of the cylindrical rods 50'. The springs 90' are also mounted upon the rear portion 110 and are positioned rearwardly of the bar 44'; this then obviates the need for the triangular plate members 38 of the first embodiment.

The cutting member 24' is formed with the top rear portion 98' thereof, having a downward angularly inclined flange portion 112 whose lower edge abuts the cutting wires 80', thus obviating the need for the bar 71 utilized in said first embodiment; also obviated is the need for the angle member 94 and the rubberized member 96.

It is thus seen that I have provided a heavy duty cutting device capable of quickly and easily forming cubes from blocks of cheese, whereby a proprietor of a restaurant can, in a relatively short period of time prepare a week's supply, or more, of cheese cubes for use in the making of pizza pies and other similar type foods having a cheese coating thereupon.

While I have shown and described the preferred embodiments of my invention, there are many modifications which may be made therein by persons skilled in the art without departing from the spirit and scope of the invention as defined by the appended claims.

What is claimed is:

1. A cutting device adapted to cut a block of cheese into cubes, said cutting device comprising a base, and a cutting member pivotally connected to said base, spring means interconnected between said base and said cutting member for biasing said cutting member in an upward angularly inclined position with respect to said base, said base having a plurality of horizontal rods disposed longitudinally thereacross in spaced parallel relationship, said rods being adapted to have a block of cheese placed thereon, said cutting member having a plurality of cutting wires disposed longitudinally thereacross in spaced parallel relationship, said cutting wires being laterally offset with respect to said rods and being adapted to move vertically within the spaces between said rods, and a locking member secured to said base, whereby when said cutting member is moved from its upward position to its downward position, it cuts said cheese block and engages said locking member, which retains said cutting member in its downward position; whereupon said cut cheese block may be removed from the rods upon which it is positioned, said cutting wires being independently connected to said cutting member, and means positioned adjacent the end portions of said wires for limiting the force transmitted to said end portions, whereby preventing the same from being easily broken, said means for limiting the force transmitted to the end portions of said cutting wires positioned at the front of said cutting member comprising a transverse member connected thereto, said transverse member having a first downwardly projecting flange abutting said wires and a second downwardly projecting flange having a plurality of spaced horizontal openings through which said wires project, said cutting member including a rectangular bar having the front end portions of said cutting wires connected thereto, and means for adjustably spacing said rectangular bar forwardly of said second flange to tense said cutting wires, and said rectangular bar including means for tensing each of said wires independently of the other of said wires.

2. A cutting device in accordance with claim 1, wherein said cutting member includes a rear wall having a plurality of spaced horizontal openings therein, and a rod externally connected to said rear wall; the rear end portions of said cutting wires projecting through said openings and being connected to said rod, and said rod including means for tensing each of said wires independently of the other of said wires.

3. A cutting device in accordance with claim 2, wherein the means for limiting the force transmitted to the rear end portions of said cutting wires comprises a rectangular bar which is internally connected to the rear wall of said cutting member and whose lower edge abuts said cutting wires.

4. A cutting device in accordance with claim 2, wherein the means for limiting the force transmitted to the rear end portions of said cutting wires consists of a downward angularly inclined flange member formed integrally with the top rear portion of said cutting member, the bottom edge of said flange member being in abutting engagement with said cutting wires.

References Cited by the Examiner
UNITED STATES PATENTS

| | | | |
|---|---|---|---|
| 2,073,257 | 3/1937 | Van Riper | 31—23 X |
| 2,356,179 | 8/1944 | Proudman et al. | 31—20 |
| 2,472,699 | 6/1949 | Gangemi. | |
| 2,658,275 | 11/1953 | Kaplan et al. | 31—28 X |

SAMUEL KOREN, *Primary Examiner.*

HUGH R. CHAMBLEE, *Examiner.*